Figure 3:
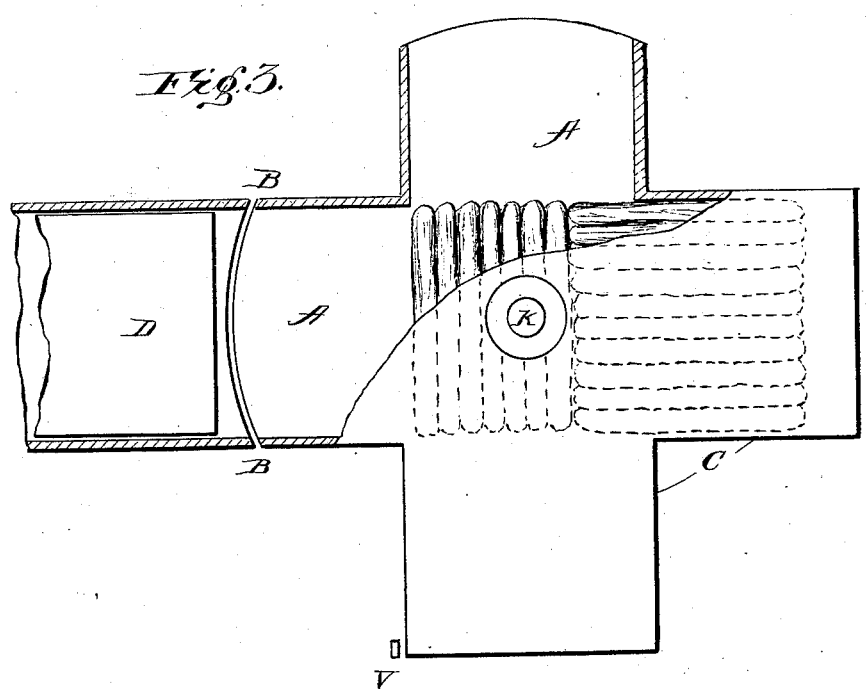

No. 679,732. Patented Aug. 6, 1901.
P. K. DEDERICK.
BALING PRESS.
(Application filed Aug. 7, 1895.)
(No Model.) 6 Sheets—Sheet 1.
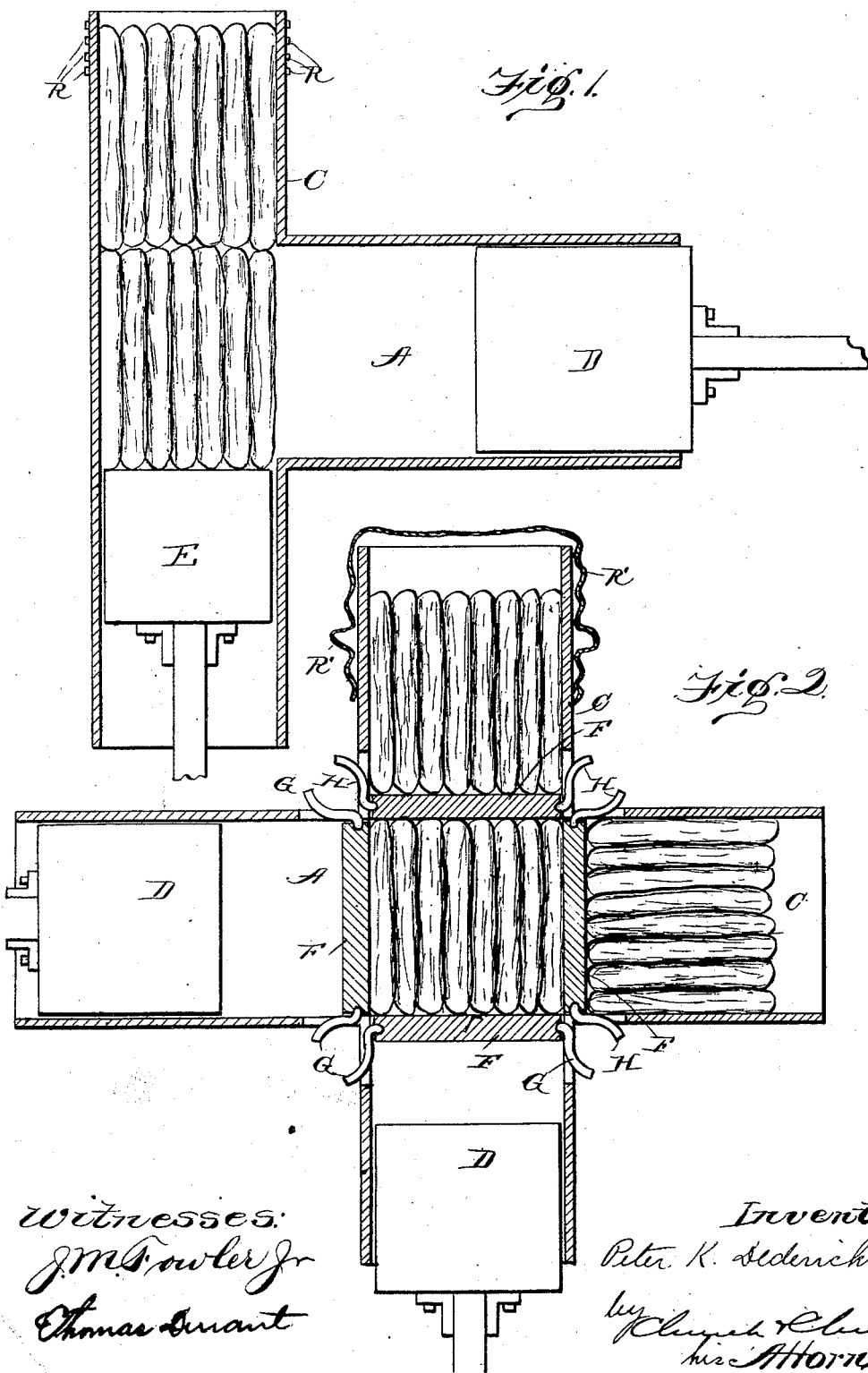

No. 679,732. Patented Aug. 6, 1901.
P. K. DEDERICK.
BALING PRESS.
(Application filed Aug. 7, 1895.)
(No Model.) 6 Sheets—Sheet 2.

Witnesses:
J. M. Fowler Jr
Thomas Durant

Inventor
Peter K. Dederick
by Clinand & Church
his Attorneys

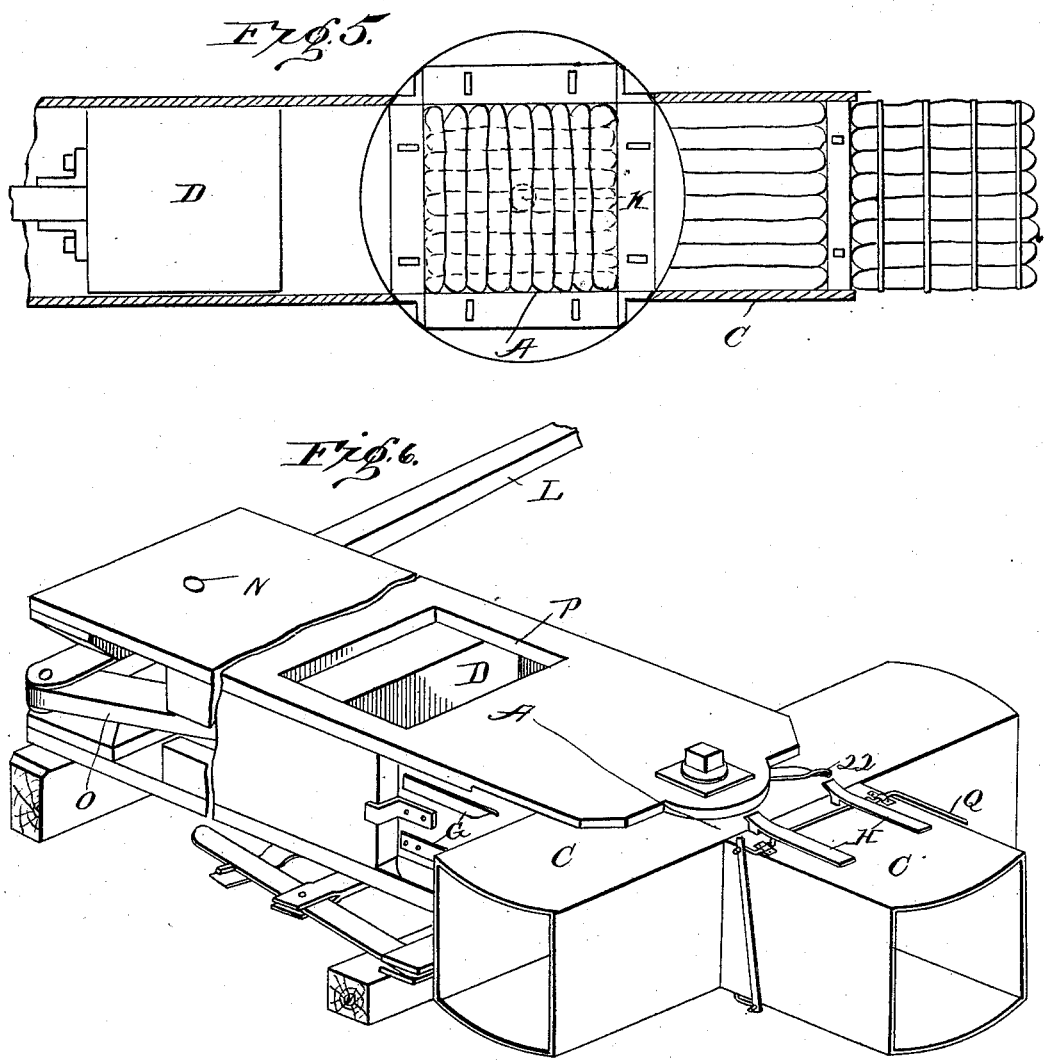

No. 679,732. Patented Aug. 6, 1901.
P. K. DEDERICK.
BALING PRESS.
(Application filed Aug. 7, 1895.)

(No Model.) 6 Sheets—Sheet 4.

Witnesses:
J. M. Fowler Jr.
Thomas Durant

Inventor:
Peter K. Dederick,
by Clough & Clough
his Attorneys.

THE NORRIS PETERS CO., PHOTO-LITHO., WASHINGTON, D. C.

No. 679,732. Patented Aug. 6, 1901.
P. K. DEDERICK.
BALING PRESS.
(Application filed Aug. 7, 1895.)
(No Model.) 6 Sheets—Sheet 5.

Witnesses:
J. M. Fowler Jr.
Thomas Durant

Inventor
Peter K. Dederick
by Church & Church
his Attorneys

No. 679,732. Patented Aug. 6, 1901.
P. K. DEDERICK.
BALING PRESS.
(Application filed Aug. 7, 1895.)
(No Model.) 6 Sheets—Sheet 6.
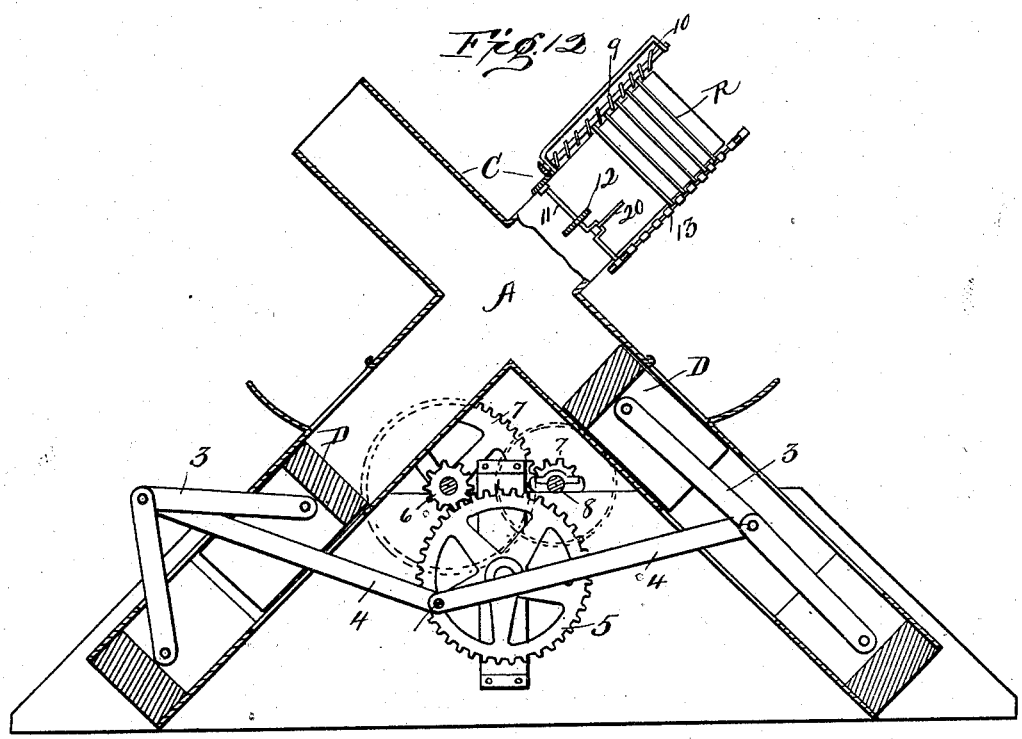
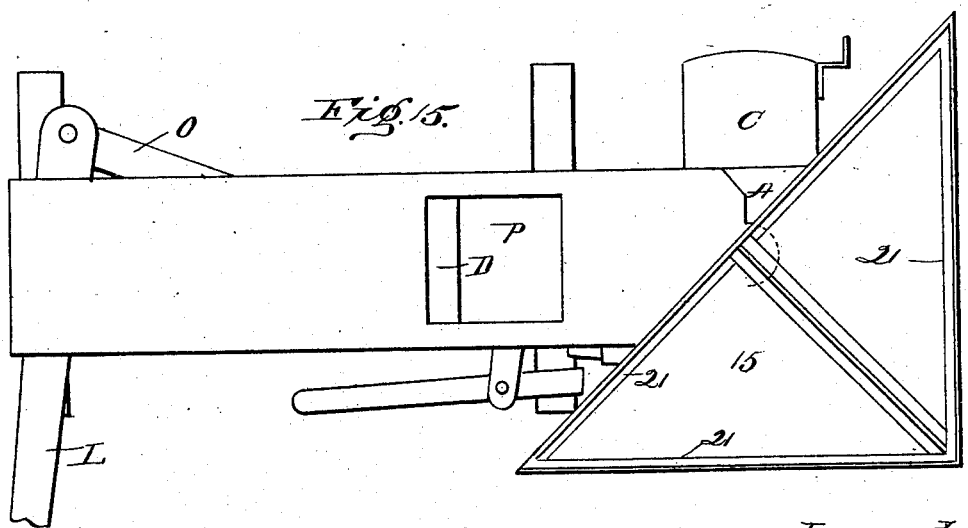
Witnesses:
J. M. Fowler Jr.
Thomas Durant
Inventor:
Peter K. Dederick
by Church & Church
his Attorneys

UNITED STATES PATENT OFFICE.

PETER K. DEDERICK, OF LOUDONVILLE, NEW YORK.

BALING-PRESS.

SPECIFICATION forming part of Letters Patent No. 679,732, dated August 6, 1901.

Application filed August 7, 1895. Serial No. 558,531. (No model.)

*To all whom it may concern:*

Be it known that I, PETER K. DEDERICK, of Loudonville, county of Albany, and State of New York, have invented certain new and useful Improvements in Baling-Presses, of which the following is a specification, reference being had to the accompanying drawings, forming part of the same, and to the characters of reference marked thereon.

In all baling-presses heretofore the bales are either removed from the press after being bound by opening the box or case in which the bale was formed, as in all box-presses; otherwise the bale is ejected in the direction pressed by the operation of the press in forming another bale, as in the continuous press, and in either case the bands being passed around and secured on the bale within the machine where, as with my improved baling-presses herein set forth, the bale is forced out or ejected in a direction transverse to that pressed and while under pressure and is ejected within the band or bands instead of the bands being put around the bale. Hence a new operation and a new method of discharging and binding bales.

Figures 1 to 16 illustrate my invention.

Similar characters represent similar parts.

A is a bale-forming chamber and receiving-box; C, the bale-depositing chamber from which it is ejected.

D is the traverser.

Fig. 1 illustrates a simple method of carrying my invention into practice. The loose material is deposited in the press-box A and condensed into the one end thereof by traverser D, to which power is applied in any suitable manner and the bale formed, either by a single charge sufficient to form a bale or by a series of charges to complete the bale in sections, as shown, when it is held under pressure by the power, which is stopped at the limit of the stroke, and power is then applied to traverser E in any suitable manner to force the bale into the chamber C, so that the flakes or layers are lengthwise of chamber C instead of transverse the chamber, as always heretofore. Traverser E is now withdrawn to its former position and another bale is formed in a similar manner, which is in turn forced from chamber A into chamber C, thus ejecting the previous bale, and the operation is thus continued. It should be observed that the bale having been pressed in a direction transverse of chamber C its expansive force is exerted against its walls transversely. Hence it does not expand out of its end, and the walls of chamber C may be a thin steel tube, over which the bands (preferably in the form of a hoop or square) for binding the bale may be slipped, as indicated at R, and they are then moved off this tube on the bale either by hand or automatically at suitable intervals as the bale is being ejected, or a case of sacking or a bag may be used, as shown at R in Fig. 2, where covering is desired, as in baling cotton, or a tube of sheet metal would answer the same purpose, either of the above being passed over the case C and drawn off by the bale, or as the bale is ejected from chamber C and the bale expands into the sacking, bag, or case as fast as ejected, and may be thus retained without the use of other bands; but in either case, whether bands, bag, or case is used, the bale is passed from the case or chamber C into them. The bands might be passed around and secured directly to the bale, automatically or otherwise, as it comes out of the press instead of first putting the bands on the case of the chamber, or the bale might be ejected endwise into the bands without the use of the chamber C by the use of the ordinary removable end door of box-presses and then reversing into the end of the pressing traverser and head to receive the bands, as shown at M, Fig. 4, so that when the bale is pressed and door removed the bands may be placed around the end of the bale in the recesses at M and moved off at suitable intervals as the bale is ejected by traverser E exactly as with use of the case or chamber C, and a sack, case, or bag may also be thus applied.

In Fig. 2 the construction and operation are varied, in that there are two ejecting-chambers C, and the press-box A extends in two directions transversely of each other toward the two traversers D, which are operated by any suitable power alternately, and the bale thus pressed alternately from transverse directions is forced into chambers C alternately and endwise of its flakes or layers, as shown, and ejected into band or bands alternately, as heretofore described. Partition-followers are preferably used in this operation instead of stopping the power and traverser to retain the pressed bale, and these partitions F are held by retainers G G, so that they cannot expand back into the feed end of press-box A, and they are alternately forced across the chamber A in transverse directions in forming another bale and into the entrance of chambers C, where they are arrested by retainers H, which have beveled or rounded ends to bear against and slip along the bale, but catch into recesses in the edge of the partition-follower and retain them to form a rigid head to complete the bale against, after which the retainers are tripped to release the follower and eject the bale by forcing another from chamber A into chambers C, and the partitions thus pass out with the bales and are again passed into press-box A, following other bales. This construction requires two pressing-traversers to be operated by power mechanism and desirable for rapid work or a stationary machine, and to cheapen and make a lighter portable machine I pivot the common bale-forming chamber A, Fig. 5, at both top and bottom to a frame, as pivots K, thus allowing it to be moved a quarter-turn back and forth, or it may be turned entirely around, quarter-turn at a time. Thus a single power and traverser D and single receiving-chamber C may be used by revolving the central press-box section A with the bale partitions and retainers. The movement quarter-turn each bale after it is formed brings the end of each bale to the entrance of chamber C, into which it is forced by the next forming bale, so that but one depositing or ejecting chamber C is required and one traverser D and one power, the rotary intermediate press-box or bale-forming chamber A turning the bale, so as to present transverse sides to the traverser and receiving-chamber, and thus to pass out of chamber A in a transverse direction to that in which the bale was formed, the straight lines showing the direction of layers as pressed in chamber A and the dotted lines after revolving the chamber A quarter-turn ready to force the pressed bale in chamber C by forming another in chamber A and using the same partitions and retainers. As previously described, this operation requires that either chamber A or C move a little before or when revolving chamber A unless double partitions are used with concave and convex surfaces to conform to each other. The central chamber in revolving might carry with it receiving-chamber C, thus requiring two, as Fig. 3. Press-box A is separated or intersected at B B for rotating on pivots K, thus bringing the single traverser D alternately in line with the press-box A from transverse sides. The traverser may be actuated by any suitable power device and the traverser and power might be moved quarter-turn and back instead of the press-box with same result, the partitions, receiving-chambers, retainers, and operation otherwise being exactly the same as in the preceding description and being, in fact, the same except the movement of the chamber or the traverser and power a quarter-turn back and forth to bring the transverse sides of press-box A alternately in line with the traverser and against a stop, and the binding operation in all cases is exactly as heretofore described, the chamber C being the same and the flakes or layers and bale passing through it endwise in all cases, so that its expansive force is transversely of the chamber.

Figure 4:
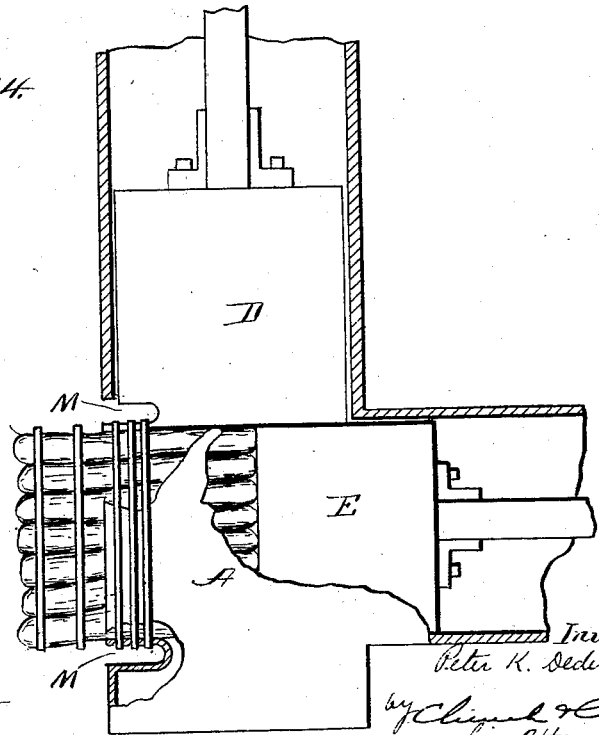

The chamber C may be an ordinary open side chamber or frame, as shown, and it might be shortened to contain less than a bale or lengthened to contain more than one bale at a time, and the chamber may be adjustable, if desired, to vary the resistance or friction, as also might chamber A be extended in direction of the pressing-traversers D, so as to contain one or more formed bales preliminary to forcing them into the chamber C shown, or there might be four chambers C and either used for forming or discharging bales and rotated in either direction quarter-turn or more, or chamber C might be in part or wholly dispensed with by passing the bands from chamber A, similar to Fig. 4 herein, as all that is required is to eject the formed bale from the press endwise or in the direction of its layers or flake ends, and the entire operation may be carried out either with or without the use of partition followers and retainers. It should be observed that this method of forming and discharging bales combines the advantages of both the ordinary continuous presses and the old box-presses and also dispenses with the disadvantage of both, as it is really continuous in operation and ejects its own bale; but the bales are not used for friction resistance and they are of exact uniform size and shape and with unbruised surfaces as box-pressed bales instead of variable in shape and size and chafed and bruised surfaces as continuous-pressed bales, hence really removing the cause of prejudice in the markets against continuous-pressed bales by dispensing with their use for friction resistance, so that the hay shows to much better advantage in quality and loads in a car to much better advantage than either the box or ordinary continuous-pressed bales, and the method of binding the bales retains them nearer where pressed, so that less density is required in the press to secure the same-sized bale; hence less damage to the material pressed and less power required to do the pressing, not to mention economy of time and convenience in binding bales.

Figure 6:
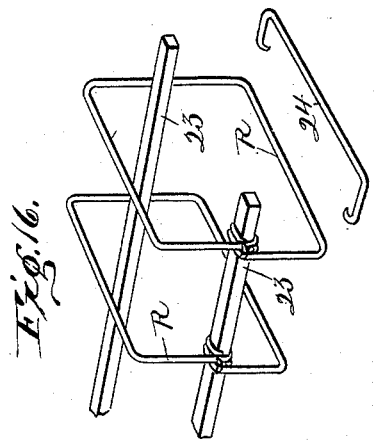

Fig. 6 represents a completed machine having the construction represented in Fig. 3 and to operate as described. The power represents a class known as "reversible-horse-lever" power, in that the operation is to reverse the horse to vibrate the horse-lever half-turn and back and making a stroke of the pressing-traverser each reverse movement of the horse-lever. Any other well-known reversible-lever power or full-circle-lever power may be applied to the traverser instead, as all that is required is to communicate a reciprocating motion to the traverser.

L is the horse-lever, pivoted at the point N and having the pitman O attached, the one end to the projecting end of the horse-lever and the other end to the traverser D.

P is the feed-orifice, through which the loose material is passed in front of the traverser, which forces it into the central chamber A, which is revolved quarter-turn on completion of each bale, and another bale formed against its end in like manner, thus forcing it into one of the chambers C, and the operation is thus continued, forcing bales alternately in chambers C and ejecting others therefrom, as heretofore described. The retainers G and H shown are of the spring form, but hinged retainers, or any other suitable stop, may be substituted, and retainers may be used on all four sides, or only two sides, as desired, of both the entrance and discharge openings of the central chamber A.

Q is a lever operating a cam or a cam-shaped rod, as shown, to trip the retainers at the discharge side after the bale is formed, thus allowing the bale and follower to pass out. Connections may be made to the same lever to trip the retainers on all sides, or they may be tripped by separate levers, as described, or they may all be tripped automatically by cams, as projection 22, so that as the chamber revolves the cam end passes under the retainer end and trips it, and in going back the retainer passes under it. I have shown a spring-cam; but they may be hinged, if desired, and the construction may be varied, the only essential being contact of the retainer with a projection or cam that will trip it as the chambers are revolved quarter-turn. I preferably allow the retainers at the feed end or toward the traverser to bear behind the follower and form recesses in the follower edges for the retainers to catch at the chamber C end; but all that is essential is to retain the partition and release it after each bale is formed.

Figure 9:
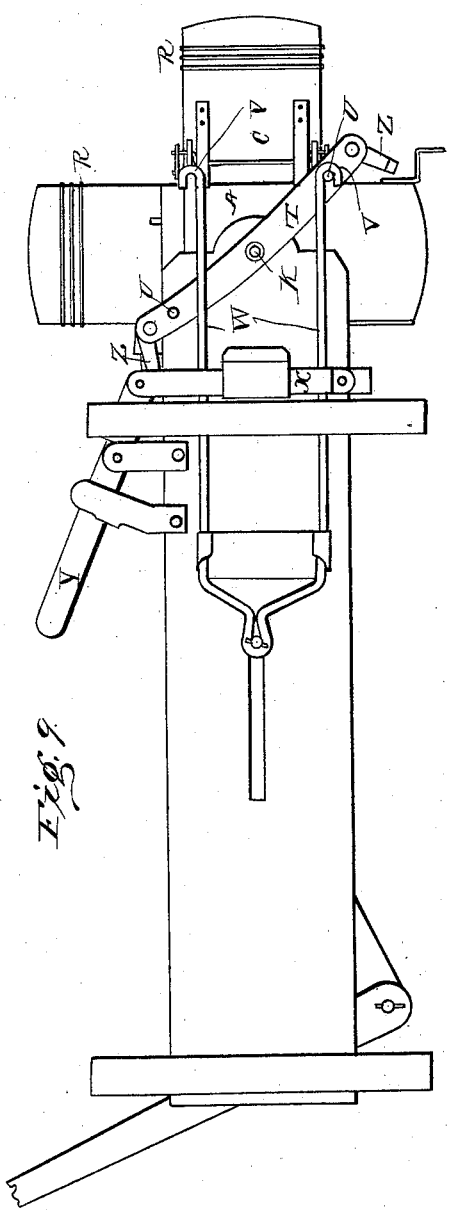
Figure 8:
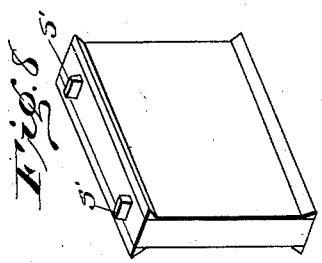
Figure 7:
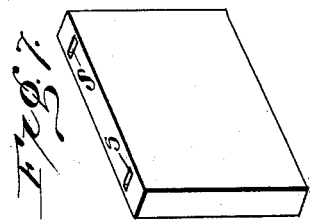
Figure 10:
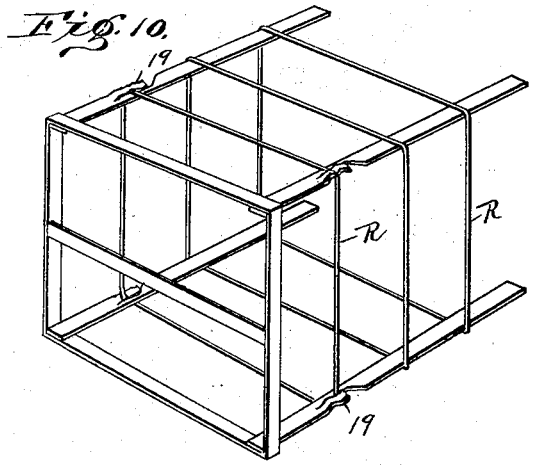

Fig. 7 shows a follower or partition, and S the edge recesses, which are on two or more sides to receive the retainer ends. Where it is desired to round or bevel the corners of the bale, I construct the partition as shown in Fig. 8, there being projections, or two raised edges on each side of the partition and corresponding rounded or beveled corners made in the chambers each side of chamber A. Instead of recesses S, Fig. 7, there may be projections S, Fig. 8, with corresponding grooves in the walls of the chamber to receive these projections, or the projections may be made to move in and out of the partitions by means of springs or otherwise and in passing through the press are brought against a rigid stop or projected into an opening and tripped or released after each bale, as heretofore described. The central chamber A, with or without chambers C, may be also automatically revolved quarter-turn after each bale by connection with the moving parts of the press, as illustrated in Fig. 9, which is a bottom plan of the press.

Figure 11:
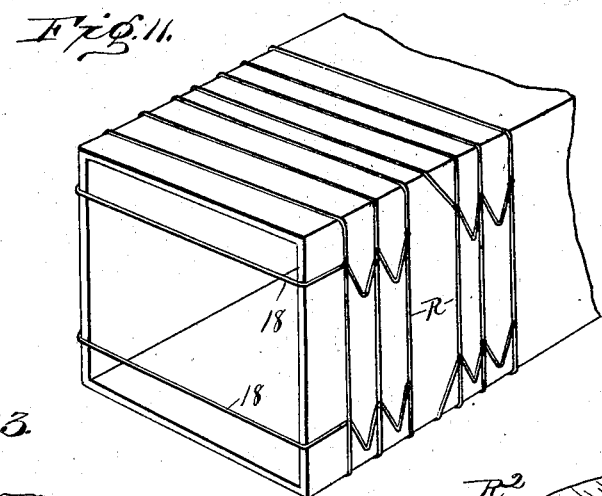

T is a cross-head secured to chambers C or A direct or to the hub or bearing K, extended down for the purpose. This cross-head is provided with two projections or pivots U to engage the hooks V of the slide-arms W, which are connected to the traverser through the chamber-bottom, as shown, so as to reciprocate back and forth with it, and passing through the slide X, which moves it from side to side by means of shipping-lever Y, so as to engage with lugs X X U alternately to revolve the chambers quarter-turn and back alternately. At the ends of the cross-head I provide catches Z, which lock the revolving chambers in position either way by catching on the end of the slide-bar X or other projection, and the movement of the said slide-bar X releases them and the revolving chambers and also brings the other hook or catch V in position to revolve the chambers quarter-turn the other way, when the other catch Z locks to the other end of the slide X, and the operation is thus continued. These shipping devices may be at the top, if preferred, or any side of the press most convenient for the work to be done, and connection may be made to other moving parts of the power instead of the traverser with the same effect, and the chamber A may be made to revolve around all one way, quarter-turn at a time instead of quarter-turn and back, by dispensing with one of the hooks V or arms W and providing four arms and lugs U on the cross-head T, and the lever and slide X thus move it in and out of contact, as required. The bands R may be slipped on and off the chambers C by hand on this horse-press; but to facilitate the operation I employ a forked instrument, preferably with four arms, as Fig. 10, and with catches 19, one, two, or three on each arm, as required, and at proper distance apart for the band, and into which catches the endless bands R are slipped, as shown, and then all passed at once, with the instrument, over chamber C. Thus as the bale emerges from the chamber C it carries the instrument and bands off with it, and the instrument is then pulled from the bale without trouble and used for the next bale. If it is desired to use slats on the bale, then the bands may be secured to the slats, as shown in Fig. 16, and thus the slats 23 are a substitute and equivalent for the instrument. I have shown hoop-iron hoops the ends of which are secured to one slat by winding around it and fastening them with a staple or T-head nail. A spring-clamp 24 is used over the end of the press-chamber C to catch behind the first band R to draw them all off as the bale moves out of the press. Either four slots or two, as shown, may be used. Instead of the instrument the bands R may be tied or wired together at the same points where the instrument catches them, as shown in Fig. 11, and thence around the end of chamber C, the string 18 doing the work of drawing the bands off, the same as the instrument, but not of placing them on the chamber C, as that must be done by hand, if tied together.

Fig. 12 illustrates one manner of constructing my invention so as to be driven by power and belt, the construction and operation being similar to that illustrated in Fig. 2 in that there are two powers, with a common chamber A and two receiving-chambers C. Fig. 12 shows this press in upright position, with two traversers D, each driven by toggle-joint arms 3 and connected to the ordinary power-gearing common to such presses, consisting of a pitman 4 and crank-wheels 5, with pinion-shaft 6 and intermediate gearing 7 7, with the power-shaft 8, on which the belt-pulley is located. The pitman 4 may be connected to the toggle-joint or to one of the arms of the joint with same effect, and the revolution of the crank-wheels alternately elevates and depresses the traversers, so that the power is required on but one joint at a time. In both of these presses I preferably use partition-heads, as heretofore described, and which are held in position by the retainers located at two or four sides of both the receiving and discharging entrance of central chamber A, as described in explanation of Fig. 2, and the retainer-trips and other appliances described in the preceding figures are all applicable to Fig. 12, as they are also to any form of construction illustrated herein for discharging a bale from chamber A by forming another against it in a transverse direction.

In Fig. 12 as the bales are ejected from the press the bands are passed from the chamber C, where they have been previously placed, as heretofore described, and moved off on the bale in the same manner, or the wire or string connection of the bands may be continuous, thus connecting bands for several bales instead of bands for one bale, as heretofore described, being of much more rapid operation. It is desirable to place a large number on the chambers C at one time and to pass them from the chamber on the bale at proper intervals automatically without stop of any part of the operation. Hence I provide screws 9, Fig. 12, at or near each corner, each thread of which carries and moves a wire or endless band, and at the discharge end the thread is preferably extended off at a much greater pitch for part of a turn, so as to form a wiper 10 to make sure to pass a band entirely off and on the bale. These screws are geared together by small shafts 11, on which are mounted toothed wheels 12, which pass through the shell of chamber C and catch into the surface of the moving bale, and thus revolve the screws 9, the periphery of the wheel 12 being of size to properly space the bands on the bale and move one off at each turn of the screw. The bands may be screwed on the chamber C by reversing the screw, and enough of them are thus stored at a time to bind a large amount of hay. An endless chain may be substituted as an equivalent for the screws to move the bands, using the same toothed wheel and shafts to move the chain instead of the screw, as indicated at 13, Fig. 12, or the chain might be moved at intervals by a crank and pawl 20, and which would do the work in the same manner. Two endless chains to cover two sides would suffice instead of 4 at the corners.

To dispense with the labor of moving hay, I extend upward the hub or pivot K of the revolving chambers and secure thereto platforms for the loose hay, as shown in Fig. 15, 15 being the receptacles constructed of any light material, with raised sides 21 and of size to hold the loose material for a bale—say one hundred to one hundred and fifty pounds. These receptacles may be attached or rest on chambers C instead of the hub K, or on both, as desired, so that they revolve with the chambers and are alternately filled and discharged, or the one being filled from the stack or mow while the other is discharged into the press to complete a bale, when the chambers and receptacles are both revolved together, and thus the operation is continued, alternating both receptacles for loose and pressed material. This revolving scaffold attachment might be revolved more than quarter turn by being loosely attached to the revolving chambers, or they might be attached to the press-top independent of the bale-chambers, or even entirely independent of the press, and do good work, but would not be as convenient, as shown. These revolving receptacles might be supported separately by weighing attachments, if desired, to make bales of uniform weight, and thus save the labor of weighing the bales.

Figure 13:
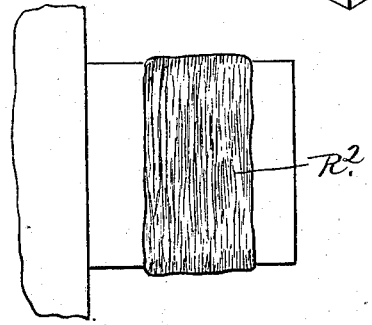
Figure 14:
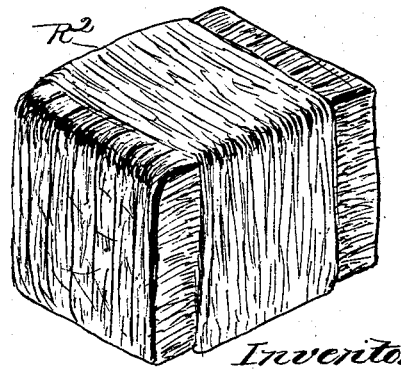

The new feature of discharging the bale endwise under pressure not only inaugurates a new method of binding bales of pressed material, but admits of binding with the material being baled—as hay, straw, cotton, or other similar material—and without the use of other binding material, thus saving all expense of bands. Some of the material being baled or other suitable material may be wound or rolled or pressed on the chamber C with or without twisting, as shown in Fig. 13, R being the band until sufficient in strength to hold the bale which expands into it, the band being shoved or drawn off as the bale is ejected in the same manner as heretofore described. These bands may be formed on chamber C by hand or by automatic devices, and the bale resultant will be as shown in Fig. 14, R being the band on the bale as passed from the chamber C, all of which I shall make the subject of other applications.

I do not herein claim all the devices, construction, and invention illustrated and described, much of the same being reserved for subsequent applications, which it is my intention to file.

I claim—

1. The combination of a press-case having a feed-passage for the entrance of the material to be baled, and a discharge-passage at an angle to the first-named passage for the ejection of the bale, of means for forcing the material into said feeding-passage to form the bale, and for ejecting the formed bale transversely through the discharge-passage into bale-confining devices, such as bands, having connections controlled by the movement of the bale to deliver the bands upon the bale; substantially as described.

2. The combination of a press-case having passages intersecting each other at substantially right angles, means for pressing the material to form bales in said passages alternately, partitions with suitable stops or retainers, and trips to release them; substantially as described.

3. The combination with a plunger, of a pivoted baling-case, having intersecting passages at substantially right angles and provided with scaffolds or receptacles for the loose material; substantially as described.

4. A pivoted press-case having intersecting passages at substantially right angles in combination with a plunger and means for operating the same to form bales alternately in the intersecting passages and a connecting device between the plunger and the pivoted press-case whereby the intersecting passages are alternately brought in line with the plunger; substantially as described.

5. In a baling-press the combination of centrally-pivoted chamber A, having transversely-arranged openings, with partitions F and suitable retainers at the transverse receiving sides and suitable stops or retainers at the transverse discharge sides of said chamber A, with means for forcing the material to be baled through said chamber in transverse directions for the purpose set forth.

6. In a baling-press the combination with the reciprocating traverser and partitions F with the pivoted central turn-chamber A having stops or retainers at its four sides and transverse discharge-openings as and for the purpose set forth.

PETER K. DEDERICK.

Witnesses:
P. K. DEDERICK, Jr.,
R. J. VAN SCHOONHOVEN.